(12) United States Patent
Kramm

(10) Patent No.: US 8,931,838 B2
(45) Date of Patent: Jan. 13, 2015

(54) VEHICLE SEAT, IN PARTICULAR MOTOR VEHICLE SEAT

(75) Inventor: Lars Kramm, Trippstadt (DE)

(73) Assignee: Keiper GmbH & Co. KG, Kaiserslautern (DE)

(*) Notice: Subject to any disclaimer, the term of this patent is extended or adjusted under 35 U.S.C. 154(b) by 165 days.

(21) Appl. No.: 13/581,927

(22) PCT Filed: Feb. 1, 2011

(86) PCT No.: PCT/EP2011/000457
§ 371 (c)(1),
(2), (4) Date: Oct. 5, 2012

(87) PCT Pub. No.: WO2011/107193
PCT Pub. Date: Sep. 9, 2011

(65) Prior Publication Data
US 2013/0015695 A1    Jan. 17, 2013

(30) Foreign Application Priority Data

Mar. 1, 2010  (DE) .......................... 10 2010 010 188

(51) Int. Cl.
*A47C 1/08* (2006.01)
*B60N 2/28* (2006.01)
*B60N 2/68* (2006.01)

(52) U.S. Cl.
CPC ............ *B60N 2/2809* (2013.01); *B60N 2/2893* (2013.01); *B60N 2/688* (2013.01)
USPC ....................... 297/253; 297/254; 297/452.18

(58) Field of Classification Search
CPC ..... B60N 2/2809; B60N 2/2893; B60N 2/688
USPC .......... 297/253, 254, 452.18, 452.49, 452.52, 297/452.55
See application file for complete search history.

(56) References Cited

U.S. PATENT DOCUMENTS

| 5,570,508 | A | 11/1996 | Ress |
| 6,371,561 | B1* | 4/2002 | Iwamoto et al. ......... 297/452.18 |
| 2004/0041450 | A1* | 3/2004 | Yamaoka et al. ............. 297/254 |
| 2005/0225138 | A1* | 10/2005 | Laporte et al. ................ 297/254 |

(Continued)

FOREIGN PATENT DOCUMENTS

| DE | 15 54 155 A1 | 9/1969 |
| DE | 203 05 074 U1 | 8/2004 |

(Continued)

OTHER PUBLICATIONS

International Search Report dated May 6, 2011 as received in corresponding PCT Application No. PCT/EP2011/000457, 6 pages.

(Continued)

*Primary Examiner* — David R Dunn
*Assistant Examiner* — Jody Giacoman
(74) *Attorney, Agent, or Firm* — Foley & Lardner LLP

(57) ABSTRACT

In a vehicle seat, in particular a motor vehicle seat, having a seat part, a rest and retaining elements for securing a child seat which is placed on the seat part of the vehicle seat, wherein the child seat can be connected to at least a first retaining element by means of at least one connector in its lower region and can be connected to at least a second retaining element by means of at least one retaining belt in its upper region, and wherein the rest has a rest frame and a cushion which is held by the rest frame, the second retaining element simultaneously supports the cushion.

9 Claims, 2 Drawing Sheets

(56) References Cited

U.S. PATENT DOCUMENTS

Figure 1:
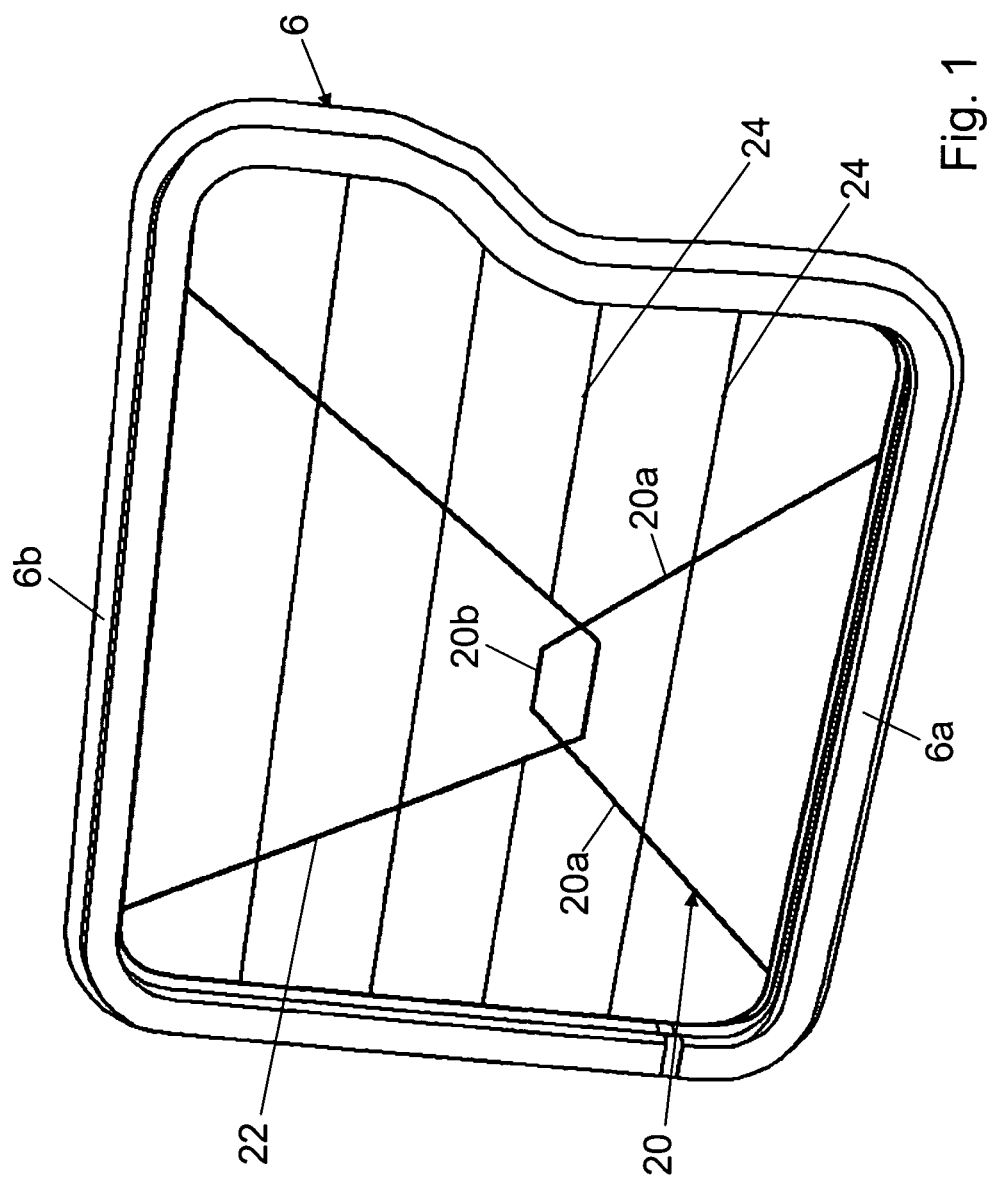

| | | | |
|---|---|---|---|
| 2006/0006713 A1* | 1/2006 | Patterson et al. | 297/250.1 |
| 2007/0176476 A1* | 8/2007 | Weber | 297/253 |
| 2008/0136150 A1* | 6/2008 | Shin | 280/735 |

FOREIGN PATENT DOCUMENTS

| | | | |
|---|---|---|---|
| DE | 20 2005 04 094 U1 | | 6/2005 |
| DE | 603 05 110 T2 | | 12/2006 |
| DE | 10 2006 058 232 A1 | | 5/2008 |
| DE | 20 2007 018 785 U1 | | 4/2009 |
| DE | 202007018785 U1 * | | 5/2009 ............... B60N 2/28 |
| EP | 0 625 445 B1 | | 8/1998 |
| EP | 1 380 464 A2 | | 1/2004 |
| EP | 1 759 967 A2 | | 3/2007 |
| JP | 11-059246 * | | 2/1999 ............... B60N 2/28 |
| JP | 11-059246 A | | 3/1999 |
| JP | 2004-090694 A | | 3/2004 |
| JP | 2004-090907 A | | 3/2004 |
| JP | 2006-321451 A | | 11/2006 |
| JP | 2008-143501 A | | 6/2008 |

OTHER PUBLICATIONS

Notice of Reasons for Rejection for Japanese Patent Application No. 2012-549296, with English Translation, date of delivery Oct. 15, 2013.

* cited by examiner

VEHICLE SEAT, IN PARTICULAR MOTOR VEHICLE SEAT

CROSS REFERENCE TO RELATED APPLICATIONS

The present application is a National Stage of International Application No. PCT/EP2011/000457 filed on Feb. 1, 2011, which claims the benefit of German Patent Application No. 10 2010 010 188.5 filed on Mar. 1, 2010, the entire disclosures of which are incorporated herein by reference.

The invention relates to a vehicle seat, in particular a motor vehicle seat, having the features of the preamble of claim 1.

For fastening child seats to vehicle seats, a so-called "Isofix" system is known, in which the lower region of the child seat may be releasably connected by means of connectors to retaining elements of the seat structure. In this case, the retaining elements are often configured as brackets and the connectors are fixed to the child seat and configured as hooks or locks, but the reverse arrangement is also conceivable. By means of a "top tether" anchoring point, the upper region of the child seat may be additionally connected to the vehicle seat, by a retaining belt being fastened to the upper region of the child seat, said retaining belt being pulled over the backrest of the vehicle seat and fastened on the rear face thereof to a second retaining element. A vehicle seat of this type is disclosed in DE 20 2007 018 785 U1, where the retaining elements are portions of a common retaining device which are configured in one piece and connected directly together.

The object of the invention is to provide an alternative vehicle seat of the type mentioned in the introduction. This object is achieved according to the invention by a vehicle seat having the features of claim 1. Advantageous embodiments form the subject-matter of the sub-claims.

The second retaining element fulfills two functions, on the one hand the connection of the retaining belt to the vehicle seat, in the present case to the backrest, and on the other hand the support of the cushion on the structure of the backrest. For both functions, separate solutions with wires are disclosed, for example for the connection to the retaining belt, in the aforementioned DE 20 2007 018 785 U1 and, for the support of the cushion, in EP 0 625 445 B1 or DE 10 1006 058 232 A1. The solution according to the invention with the dual function not only reduces the number of components and thus the costs (of the material and fastenings) but it also has the advantage that the position of the second retaining element is not as low in the vicinity of the crossmember of the seat part, but may be easily reached, for example in the middle of the backrest. If the second retaining element were to be made separately from a long wire, it would be very unstable in, and counter to, the direction of travel. The second retaining element is stabilized by being integrated in the components required for supporting the cushion. The cost-effective configuration as wire is possible as the flux of force via the retaining belt only subjects the second retaining element to tensile stress i.e. said second retaining element does not absorb any bending stresses, resulting in a high degree of strength.

The vehicle seat according to the invention may, in theory, be used in all the seat rows of a motor vehicle or a different vehicle but, in practice, is only provided in a rear seat row. Provided that the vehicle seat is a seat system with a plurality of seats, a plurality of seats may be configured according to the invention. The terms "connector" and "retaining belt" are intended to be understood in a broad sense, so that similar-acting means may also be used as an alternative.

Figure 2:
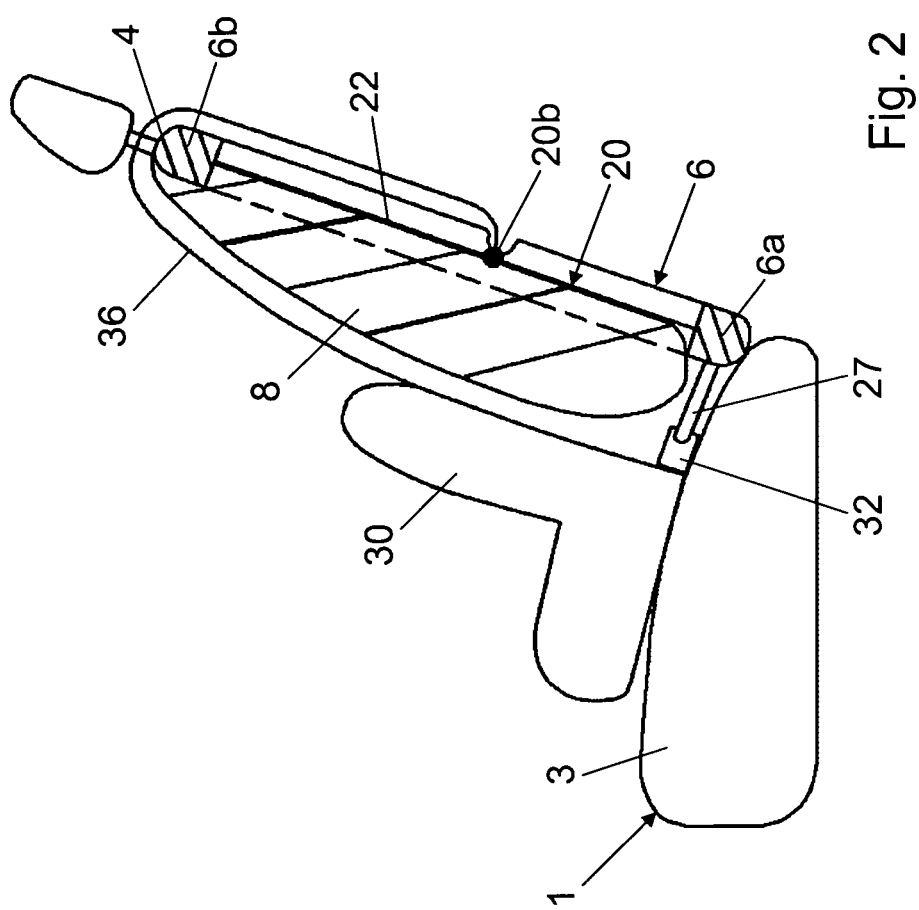

The invention is described in more detail hereinafter with reference to an exemplary embodiment shown in the drawings, in which:

FIG. 1 shows a perspective view of the backrest without a cushion and cover, and FIG. 2 shows a schematic, partially sectional side view of a vehicle seat with the child seat in position and fastened.

A vehicle seat 1 is provided in the present exemplary embodiment in a rear seat row of a motor vehicle. The arrangement of the vehicle seat 1 inside the motor vehicle and the usual direction of travel thereof define the directional information used hereinafter. The vehicle seat 1 comprises a seat part 3 and at least one backrest 4.

The backrest 4 comprises a backrest frame 6 as a supporting structure, said backrest frame on the side facing the front bearing a cushion 8 which is covered by a cover fastened to the backrest frame 6. On the side facing the rear, the backrest frame 6 bears a cover panel. As an alternative to the cover panel, a fabric covering or another cover may be provided.

The backrest frame 6 encloses a substantially planar installation space. A plurality of wires are arranged inside said installation space, said wires being fastened at their ends to the backrest frame 6. The wires serve for supporting the cushion 8. A first wire 20 of, in particular, uniform diameter is fastened with one end to the lower limb 6a of the backrest frame 6 in the vicinity of one of the two lower corners, extends in an oblique portion 20a approximately as far as the middle of the backrest frame 6, extends here (in the present case at the same time in the middle of the first wire 20) in a horizontal portion 20b parallel to the lower limb 6a and then with a further oblique portion 20a extends parallel to the lower limb 6a on which it is fastened in the vicinity of the other lower corner. Overall, a trapezoidal shape results. Preferably, the two oblique portions 20a are of the same length and extend at the same angle to the lower limb 6a.

A second wire 22 of, in particular, uniform diameter is fastened in a manner corresponding to the first wire 20 to the upper limb 6b of the backrest frame 6 and facing the middle. The portion parallel to the upper limb 6b (and to the lower limb 6a) of the second wire 22 is arranged below the horizontal portion 20b of the first wire 20, so that the two wires 20 and 22 cross over one another in the oblique portions and are preferably connected together at the points of intersection, so that the two connected wires 20 and 22 are together stretched tightly in the backrest frame 6. The cushion 8 is then supported in its middle on the wires 20 and 22. For improving the support, transverse wires 24 of, in particular, uniform diameter may be provided and which are stretched, for example, between the two lateral limbs of the backrest frame 6 and which may be additionally connected to the two wires 20 and 22.

On the supporting structure of the vehicle seat 1, preferably on the supporting structure of the seat part 3, for example on a crossmember thereof, two first retaining elements 27 are provided for a child seat 30 to be positioned on the vehicle seat 1 and to be fastened thereto, said retaining elements being configured in the shape of brackets and known as so-called "Isofix brackets". To this end, the child seat known per se comprises two connectors 32 which in the lower region of the child seat 30 protrude to the rear. The connectors 32 may cooperate with the first retaining elements 27, for example hook therein. The first wire 20, more precisely its horizontal portion 20b, defines a second retaining element which— known as the "top tether"—cooperates with a retaining belt 36 of the child seat 30. To this end, the horizontal portion 20b of the first wire 20 is preferably guided through a recess of the cover panel on the side of the backrest frame 6 facing the rear, so that it is accessible from the outside. Said retaining belt 36 is fastened in the upper region of the child seat 30, guided upward, pulled over the upper edge of the backrest 4 of the vehicle seat 1 and guided downward, where it is then fastened onto the horizontal portion 20b of the first wire 20, for example hooked-in.

The longitudinal direction of the backrest extends between the lower limb 6a and the upper limb 6b parallel thereto. The horizontal portion 20b in the exemplary embodiment is arranged approximately in the middle of the backrest 4. In the longitudinal direction of the backrest a region of 50%±20%, in particular 50%±10%, of the dimension of the backrest 4 in the longitudinal direction of the backrest is intended to be understood thereby. This arrangement has the advantage of improved accessibility relative to a low arrangement and relative to a higher arrangement the advantage that there is no obstruction from parcel shelves or load covers. The oblique portions 20a extend obliquely to the longitudinal direction of the backrest and obliquely to the lower limb 6a. An angle of 45°±25°, in particular 45°±15° to the lower limb 6a is intended to be understood thereby. The oblique path optimizes the introduction of force into the lower limb.

LIST OF REFERENCE NUMERALS

1 Vehicle seat
3 Seat part
4 Backrest
6 Backrest frame
6a Lower limb
6b Upper limb
8 Cushion
20 First wire
20a Oblique portion
20b Horizontal portion
22 Second wire
24 Transverse wire
27 (First) retaining element
30 Child seat
32 Connector
36 Retaining belt

The invention claimed is:

1. A motor vehicle seat, comprising:
a seat part;
a backrest; and
retaining elements for fastening a child seat which is placed on the seat part of the vehicle seat,
wherein the child seat may be connected to at least one first retaining element by at least one connector in its lower region and may be connected to at least one second retaining element by at least one retaining belt in its upper region,
wherein the backrest has a backrest frame and a cushion which is carried by the backrest frame, wherein the backrest frame has a lower limb and an upper limb, wherein the second retaining element simultaneously supports the cushion
wherein the second retaining element comprises a first wire, said first wire being fastened to the lower limb of the backrest frame forming a trapezoidal shape,
wherein the first wire comprises two oblique portions for fastening to the lower limb of the backrest frame and a horizontal portion therebetween for connecting to the retaining belt, and
wherein the horizontal portion is above the two oblique portions.

2. The motor vehicle seat as claimed in claim 1, wherein the horizontal portion of the second retaining element is arranged approximately in the middle of the backrest frame and inside an installation space enclosed by the backrest frame.

3. The motor vehicle seat as claimed in claim 1, wherein the horizontal portion is accessible from the side of the backrest facing to the rear.

4. The motor vehicle seat as claimed in claim 1, wherein a second wire is fastened to the upper limb of the backrest frame forming a trapezoidal shape, wherein the second wire also serves for supporting the cushion.

5. The motor vehicle seat as claimed in claim 4, wherein the first wire and the second wire cross over one another and are connected together.

6. The motor vehicle seat as claimed in claim 1, wherein transverse wires are stretched between two side limbs of the backrest frame for supporting the cushion.

7. The motor vehicle seat as claimed in claim 6, wherein the transverse wires and the first wire have a uniform diameter.

8. The motor vehicle seat as claimed in claim 1, wherein the retaining belt is fastened to the child seat, pulled over the backrest and fastened to the second retaining element.

9. The motor vehicle seat as claimed in claim 5, wherein the transverse wires and the first wire have a uniform diameter.

* * * * *